Patented Sept. 21, 1926.

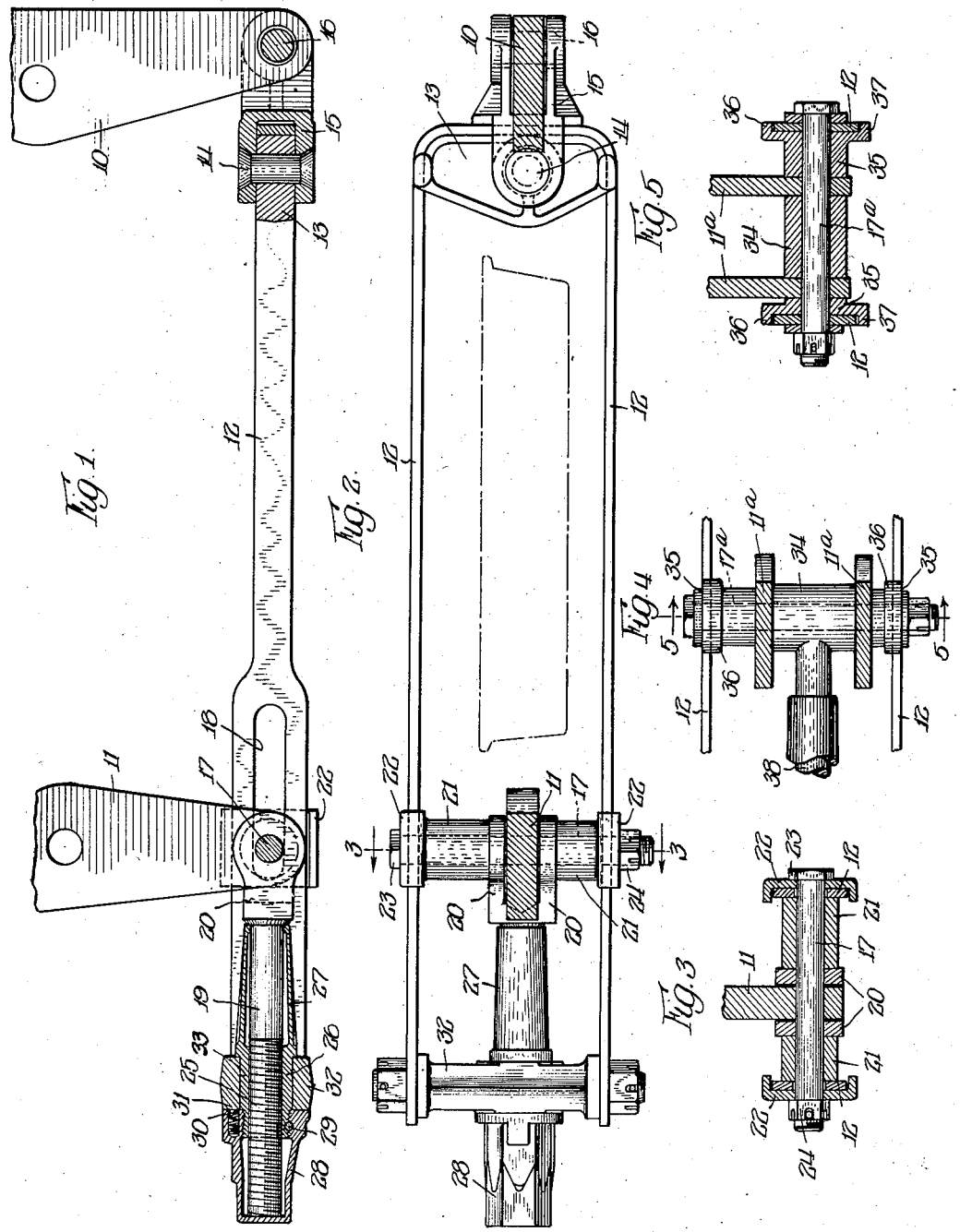

1,600,822

UNITED STATES PATENT OFFICE.

WILLIAM C. HEDGCOCK, OF CHICAGO, ILLINOIS, ASSIGNOR TO AMERICAN STEEL FOUNDRIES, OF CHICAGO, ILLINOIS, A CORPORATION OF NEW JERSEY.

BRAKE-SLACK-ADJUSTER MECHANISM.

Application filed November 28, 1924. Serial No. 752,539.

This invention relates to brake slack adjuster mechanism which is used in a rigging of the beamless type in which the truck levers are located in the plane of the brake shoes and wheels.

One object of the invention is to provide in the beamless type of brake rigging a simple, efficient and durable brake slack adjuster which includes means for protecting the threaded members against dirt, dust and the like.

Another object is to provide a brake slack adjuster in which the parts cooperate in an improved manner to meet the various requirements under operating conditions.

These and other objects are accomplished by means of the arrangements shown on the accompanying sheet of drawings, in which Figure 1 is a fragmentary side elevation of brake mechanism used in the beamless type of brake embodying my invention and showing some of the parts in section.

Figure 2 is a top plan view of the arrangement shown in Figure 1, the brake levers being shown in section;

Figure 3 is a sectional view taken in the plane of line 3—3 of Figure 2;

Figure 4 is a fragmentary top plan view of a modification; and,

Figure 5 is a sectional view taken in the plane of line 5—5 of Figure 4.

The various novel features of the invention will be apparent from the following description and drawings and will be particularly pointed out in the appended claims.

Referring to the figures of the drawings, it will be noted that the invention is illustrated in connection with the beamless type of brake rigging in which the brake levers 10 and 11 are located in the plane of the truck wheels. A tension rod in the form of a frame includes side bars 12 which are located on opposite sides of a truck wheel. A bracket 13 is mounted in the looped end of the frame, and secured to the bracket by a rivet 14 is a jaw 15 pivotally connected at 16 to the lower end of the brake lever 10.

The other brake lever 11 is adjustably connected to the tension rod or frame and guidedly supported therein by means including a pin 17 which extends between the side bars 12 and is slidably mounted in elongated slots 18 formed in said side bars. Not only is the lower end of the second brake lever 11 pivotally mounted on said pin 17, but a slack adjuster screw 19 has jaws 20 which also are pivotally mounted on said pin 17. In other words, the pin 17 forms a pivotal connection between the adjuster screw 19 and the brake lever 11. As shown in Figures 2 and 3, spacer members 21 are mounted upon the pin 17 and are interposed between the jaws 20 and the side frame bars 12. For taking wear and also guiding the brake lever 11 in its adjustable movements with respect to said side bars, channel shaped pieces 22 are mounted upon said pin 17 outwardly of the side bars 12, the flanges of said channel shaped pieces extending inwardly for cooperating with the upper and lower edges of the side bars 12. The pin 17 may be in the form of a bolt, if desired, having a head 23 for engaging one of the channel pieces 22, there being a nut 24 secured to the other end of the pin or bolt for engaging the other channel shaped guide member 22. By means of this combination, the adjusting screw 19 is directly connected to the brake lever 11 instead of through a fulcrum block. By having the pin 17 pass through the slots 18 in the side bars 12, a safeguard is provided against the said side bars falling onto the track in case of failure of the flanges on the usual fulcrum block. By using a channel shaped member or washer 22 having guide flanges to bear on the side bars, the wear is taken by relatively small and easily replaced parts.

Cooperating with the threaded portion 25 of the screw 19 is the threaded portion 26 of a nut having a housing 27. Cooperating with the nut housing 27 is an associated housing 28 which is screwed onto the nut 26 so that in effect the nut housings 27 and 28 are integral in so far as the adjustment of the screw 19 is concerned, it being understood that the members 26 and 28 are locked to each other by any suitable means 29.

From this arrangement, it will be appreciated that turning the nut portion 28 by the application of a wrench will cause an actuation of the screw 19 for varying the slack conditions. A spring pressed detent 30 carried by the nut housing 28 is adapted to cooperate with any suitable number of notches 31 in a bridging member 32 for holding the slack adjuster screw in adjusted position. In this instance, the nut 26 extends through an aperture 33 in the member 32 which bridges the bars 12 at one end.

In Figures 4 and 5 there is shown a slight modification in which instead of using a single brake lever 11, two brake levers 11ª are provided which are pivotally mounted on the associated pin 17ª, it being understood that the pin passes through elongated slots in the side bars 12 as shown in Figure 1. A hub 34 forming an integral part of the slack adjuster screw 38 is pivotally mounted on the pin 17ª and acts as a spacer between the brake levers 11ª, and interposed between the latter and the side bars 12 are combined spacers and guide members 35 having upper and lower flanges 36 and 37 adapted to cooperate with the upper and lower surfaces of the side bars 12. These guide members 35 not only perform the guiding function but also take the wear incident to movement between said bars 12 and members 35. Said parts 35 are small and may be changed at a minimum cost.

It is my intention to cover all modifications of the invention falling within the spirit and scope of the invention as set forth in the following claims:

1. In brake mechanism, the combination of a frame including bars for location on opposite sides of a truck wheel, a brake lever operatively connected to one portion of said frame, a second brake lever adjustably connected to another portion of said frame, the adjustable connecting means including a slack adjuster screw, a member movably mounted with respect to said bars and forming a direct pivotal connection between said screw and said second brake lever, and a nut for actuating said screw and having a housing for covering said screw to protect the latter.

2. In brake mechanism, the combination of a frame including bars for location on opposite sides of a truck wheel, a brake lever operatively connected to one portion of said frame, a second brake lever adjustably connected to another portion of said frame, the adjustable connecting means including a slack adjuster screw, a member movably mounted with respect to said bars and forming a pivotal connection between said screw and said second brake lever, and separate guide pieces mounted on said member guidedly associated with said side bars and adapted to take the wear.

3. In brake mechanism, the combination of a frame including bars for location on opposite sides of a truck wheel, a brake lever operatively connected to one portion of said frame, a second brake lever adjustably connected to another portion of said frame, the adjustable connecting means including a slack adjuster screw, a member movably mounted with respect to said bars and forming a pivotal connection between said screw and said second brake lever, and spacer means carried by said member and interposed between said lever and said bars.

4. In brake mechanism, the combination of a frame including bars for location on opposite sides of a truck wheel, a brake lever operatively connected to one portion of said frame, a second brake lever adjustably connected to another portion of said frame, the adjustable connecting means including a slack adjuster screw, a member movably mounted with respect to said bars and forming a pivotal connection between said screw and said second brake lever, spacer means carried by said member and interposed between said lever and said bars, and separate guide pieces mounted on said member and having flanges guidedly associated with said side bars.

5. In brake mechanism, the combination of a frame including bars for location on opposite sides of a truck wheel, a brake lever operatively connected to one portion of said frame, a second brake lever adjustably connected to another portion of said frame, the adjustable connecting means including a slack adjuster screw, a member movably mounted with respect to said bars and forming a pivotal connection between said screw and said second brake lever, spacer means carried by said member and interposed between said lever and said bars, separate guide pieces mounted on said member and having wear flanges guidedly associated with side bars, and a nut associated with said screw for actuating the screw for adjusting the second brake lever to take up slack, said nut having a housing for covering and protecting said screw.

6. In brake mechanism, the combination of a frame including bars with slots therein for location on opposite sides of a truck wheel, a pin extending between said bars and slidably mounted in the slots thereof, a brake lever pivotally mounted on said pin, a slack adjuster screw pivotally mounted on said pin, spacers mounted on said pin and interposed between said screw and bars, and guide members carried by said pin having flanges for cooperating with said bars for taking the wear, and a nut cooperating with said screw for adjusting said brake lever in accordance with slack conditions.

Signed at Chicago, Illinois, this 22nd day of November, 1924.

WILLIAM C. HEDGCOCK.